UNITED STATES PATENT OFFICE.

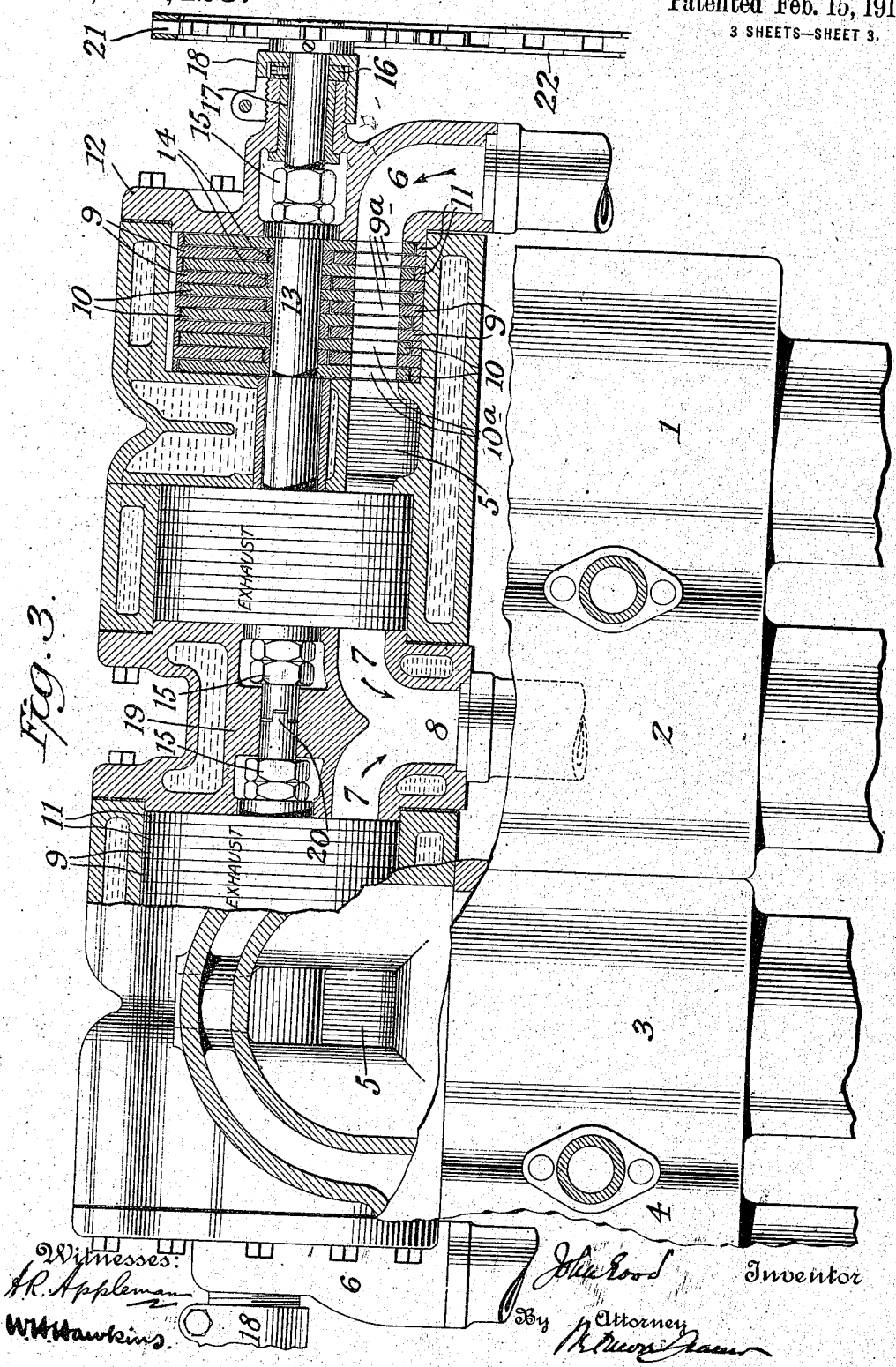

JOHN GOOD, OF BROOKLYN, NEW YORK.

INTERNAL-COMBUSTION ENGINE.

1,171,428.

Specification of Letters Patent. Patented Feb. 15, 1916.

Application filed January 17, 1914. Serial No. 812,632.

*To all whom it may concern:*

Be it known that I, JOHN GOOD, a citizen of the United States, residing in the city of Brooklyn, in Kings county and State of New York, have invented the following-described Improvements in Internal-Combustion Engines.

The invention concerns the arrangement of the valve ports and valves for internal combustion engines having rotary disk valves and more particularly for engines having labyrinth valves as hereinafter described, the object being an efficient, compact and simple valve structure easily incorporated in the cylinder head structure and particularly adapted for multi-cylinder engines in which the cylinders are close set in a row.

Figure 1:
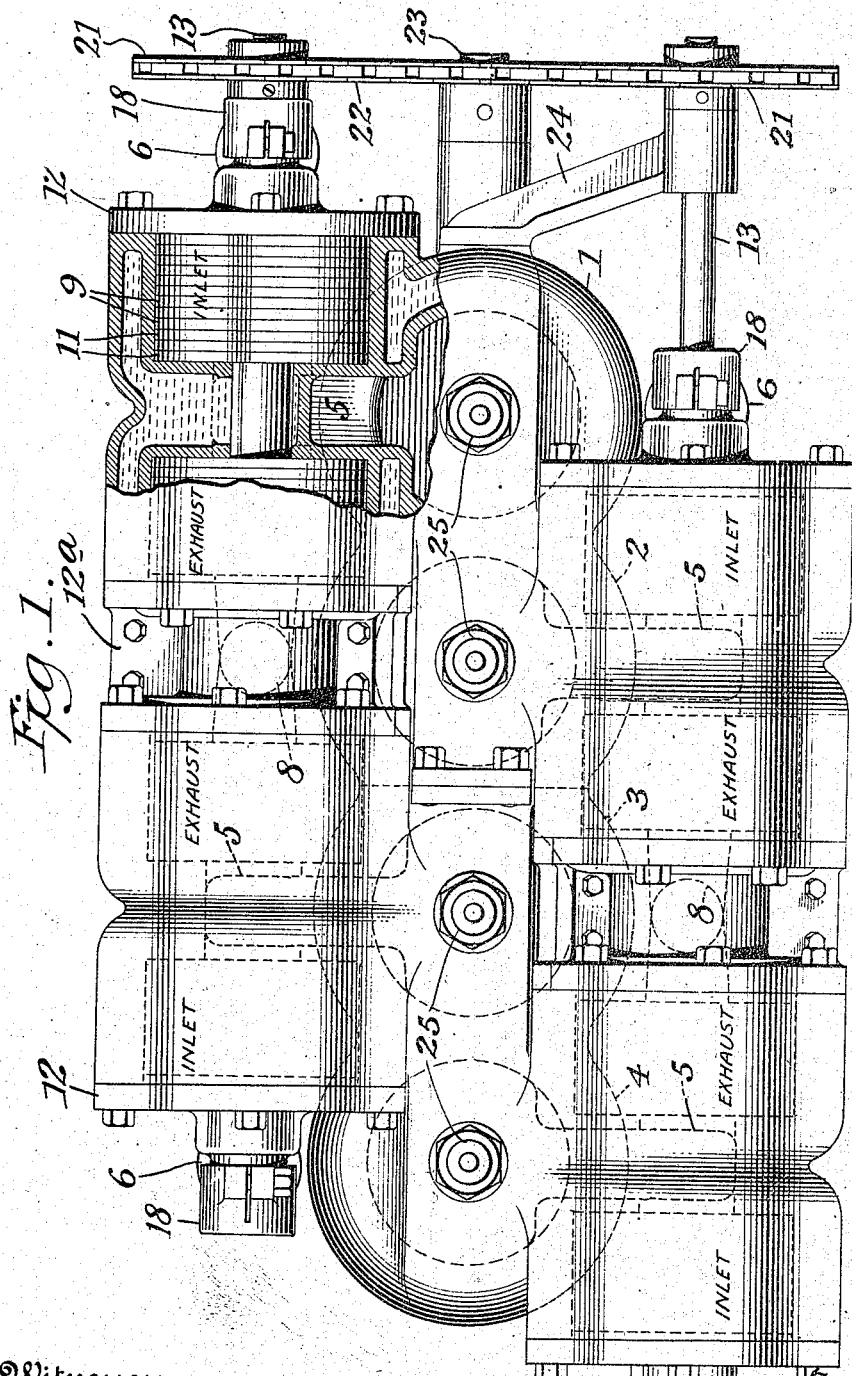
Figure 2:
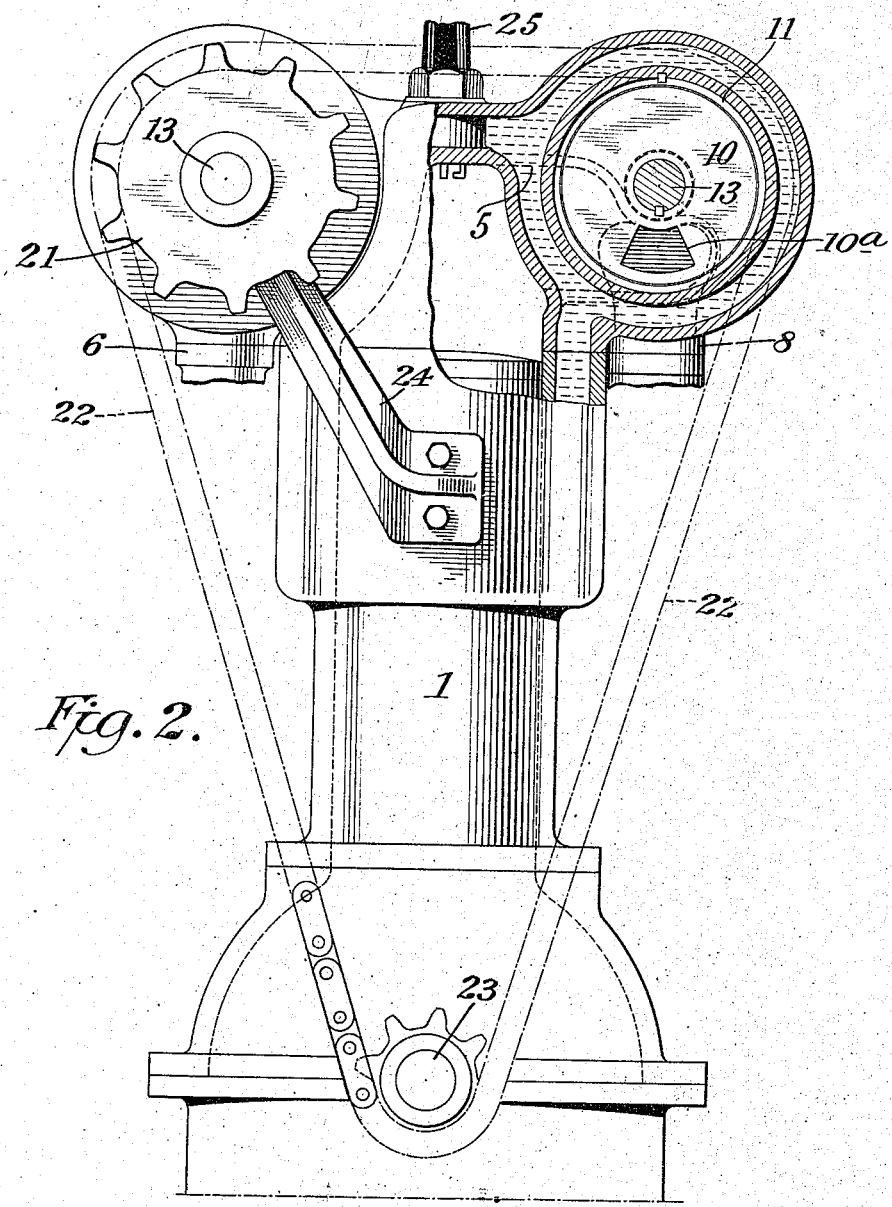

In the drawings forming part hereof, Figure 1 is a top plan view of a four-cylinder engine having the valve mechanism of the present invention, with parts in section; Fig. 2, an end elevation, with parts in section; Fig. 3, a side elevation with parts broken out and shown in section.

In the engine illustrated the cylinders 1, 2, 3 and 4, are cast in pairs, although they might be otherwise, and are mounted on a suitable base with which they form a crank case inclosure, as usual. The head structure, in one or more parts, is bolted to the cylinders and provides within it an L-space 5, or lateral chamber extension, for each cylinder, at or near the top thereof. These spaces, or lateral passages 5, extend in opposite directions above each successive cylinder in the row, so that on the first and third cylinders they are on the right-hand side and on the second and fourth cylinders they are on the left-hand side. Both the intake and exhaust gases pass through these passages, the former entering through the connecting passages 6, and the latter through the passages 7, under the control of the various valves which thus become disposed on opposite sides of the engine as a whole. The adjacent valve structures on each side serve alternate cylinders and the exhaust valves on each side are arranged proximate to each other with an inlet valve at each end of the set, as marked in the drawings.

In the case in hand, the inlet and exhaust valves are structural duplicates of each other, although they might be otherwise, and each is composed of a series of relatively fixed disks or valve members 9, and a series of relatively rotary disks or valve members 10 interlapping with the fixed disks. The fixed members 9 are fixed in the head structure with their port openings 9ª in alinement with each other and with the passage 6 or 7, as the case may be, and are spaced apart by a series of spacer rings 11, and clamped in place by the cover-plate 12. The rotary members 10 are mounted on the shaft 13 and spaced apart thereon by means of a series of interposed washers 14 and clamped in place by nuts 15 threaded to the shaft. The relative dimensions of the spacer rings, washers and disks or members, are such as to form a labyrinth crevice between the two series of disks when the same are assembled, as shown in the drawings, such crevice being desirably narrow in accordance with the disclosure of a co-pending application filed by me on June 28th, 1913 Serial No. 776,206. The shaft-borne disks have their several port openings 10ª arranged in alinement, so that when the shaft is rotated they are brought into registry with the openings 9ª of the disks 9, thereby opening a free passage through all of the disks, through which the gas charge or combustion products may enter or escape, and passing such registration close that passage and confine the charge within the cylinder, notwithstanding that the said interlapping members may have no contact with each other and that the interior pressure may be high.

The moving members of the valves on each side of the engine are preferably arranged to rotate on the same horizontal or longitudinal axis, as by mounting them all upon the shaft 13, the disks 10 thereof being securely clamped or fixed to such shaft with the port openings in inlet disks disposed in the proper angular relation to those in exhaust disks to accommodate the action of the piston in each cylinder. Each shaft 13 in the present case is journaled at its ends and at the middle, but it may be supported in other ways according to the design of the engine, and is maintained in its proper longitudinal position by means of adjusting devices at both ends. Such means comprise a collar 16, adjustably set-screwed to the shaft and held against the end of its adjacent bearing 17 by a split and threaded housing 18, the latter being screwed over the bearing and clamped in position in an obvious manner. A similar adjustment device is provided within the housing 18 at the opposite end of the shaft, the purpose being to set and maintain the rotary shaft or the shaft-borne disks in an approximately centralized position between the complementary fixed disks so that they will run freely and without contact therewith.

Within the middle bearing 19, the shaft 13 is provided with an extension joint 20, virtually sub-dividing the said shaft into two sections, each of which carries the exhaust and intake disks for one cylinder. The joint accommodates such expansion of the length of the shaft as may arise from the change of its temperature, from idle to running condition, and prevents material disturbance of the centralized position of the movable disks between the others. While the said joint is perhaps not essential to the operation of the engine shown, it is nevertheless desirable, inasmuch as it allows the labyrinth crevice between the disks to be made practically as narrow as desired without danger of displacement and binding contact due to the temperature change.

The expansion joint 20 may take on a variety of forms. In the drawings it is shown as a tenon and mortise joint which enables one shaft section to drive the other.

When the head structure which accommodates the shafts 13, is water-jacketed, the portion of the shaft sections between inlet and exhaust valves passes through the water-jacket and above the ends of the L-spaces 5, as indicated in Fig. 3. One of the shafts is supported in a bracket 24 and each is driven by a sprocket wheel 21 and chain 22, from the crank shaft 23, this form of drive being simple and efficient, and wholly practical since the load on the valve shafts is merely that of the friction in the journals. In the depression between the valve housings of the head structure, an aperture is drilled and tapped to receive the spark plug 25, or, in the case of certain types of engine a fuel injector or other appurtenance. The magneto for the spark plug, the commutator, pumps, etc., may be driven by either valve shaft, as desired, the space inside the bracket-arm 24 forming a convenient location for some or all of these devices.

I claim—

1. The combination, in an internal combustion engine comprising cylinders in a row, of two sets of rotary valves disposed respectively on opposite sides of said row, each set controlling the intake and exhaust ports of alternate cylinders in the row.

2. In a multi-cylinder internal combustion engine the combination of a rotary valve shaft common to several cylinders and operating a rotary valve for each said cylinder, said valve comprising a series of movable ported members and a series of relatively fixed ported members interlapping therewith, the said members by their rotation being adapted to open and close passages through the valves to the respective cylinders served thereby.

3. In a multi-cylinder internal combustion engine, the combination of a rotary valve shaft common to several cylinders, rotary valves operated thereby each comprising a series of ported members borne on the shaft and a series of relatively fixed ported members interlapping with the others, the relatively movable members coacting with the fixed members to open and close a passage from the cylinder extending through said members in a direction parallel to the valve shaft, and means for rotating the valve shaft.

4. In a multi-cylinder internal combustion engine, a rotary valve shaft extending alongside of several cylinders, a plurality of labyrinth valves operated by such shaft, each valve comprising a series of relatively fixed ported members and a series of relatively movable ported members interlapping therewith, and means for preventing displacement of the rotary members by the thermal expansion of their operating means.

5. In a multi-cylinder internal combustion engine, a rotary valve shaft extending alongside of several cylinders, a plurality of labyrinth valves, each comprising a series of relatively fixed disks and a series of relatively rotary disks interlapping therewith, the latter being secured to the valve shaft adjacent the cylinders and an expansion joint in the shaft between the cylinders.

6. In an internal combustion engine, the combination of a row of cylinders, each successive cylinder having an L-passage turned in the opposite direction, a pair of valves comprising interlapping rotary disks controlling each passage, a valve shaft on each side of the said row for operating the valves on each shaft and means for rotating both shafts.

7. In an internal combustion engine, the comibnation with a rod of cylinders, a pair of labyrinth valves serving each of the same, and comprising disks mounted on a rotary shaft section and means for driving the said sections adapted to relieve each shaft from displacement by the expansion of its neighboring shaft section on change of temperature.

8. In a multi-cylinder internal combustion engine, a row of cylinders having L-passages at their upper ends, labyrinth valves between such passages rotating on axes parallel with the engine crank-shaft and adapted to control the inlet and exhaust through the said passages, in combination with a common valve shaft for such valves extending alongside of the row of cylinders.

In testimony whereof, I have signed this specification in the presence of two witnesses.

JOHN GOOD.

Witnesses:
G. A. TAYLOR,
K. L. GRANT.